Patented Mar. 3, 1931

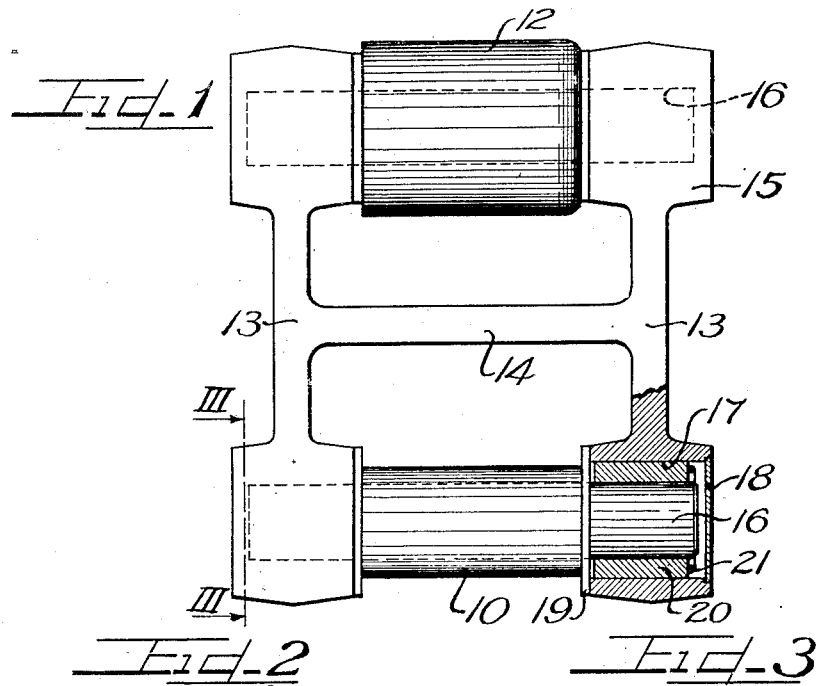
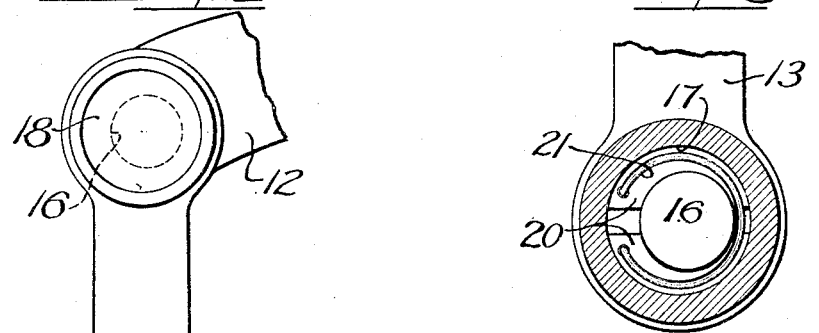
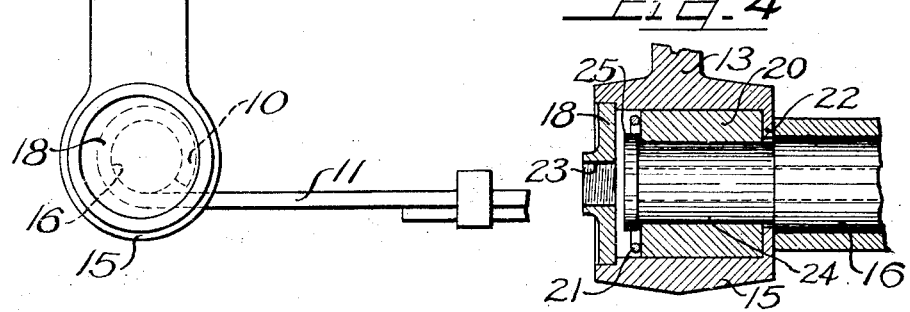

1,794,899

UNITED STATES PATENT OFFICE

GEORGE H. HUFFERD, OF DETROIT, MICHIGAN, ASSIGNOR TO THOMPSON PRODUCTS INCORPORATED, A CORPORATION OF OHIO

SHACKLE AND BEARING THEREFOR

Application filed April 11, 1927. Serial No. 182,716.

This invention relates to self adjusting bearings for oscillating shafts wherein the relatively movable parts do not make a complete rotation.

It is an object of this invention to provide an improved bearing for oscillating shafts that is easily assembled and lubricated, cheaply manufactured, and in which rattling is prevented by means of an automatic self-adjusting mechanism which compensates for any wear in the bearing or shaft.

It is a further object of this invention to provide an improved form of self adjusting spring shackle bearing wherein wear in the bearing is automatically taken up without externally adjustable mechanism.

Other and further important objects of this invention will be apparent from the disclosures in the specification and the accompanying drawings.

This invention (in a preferred form) is illustrated in the drawings and hereinafter more fully described.

On the drawings:

Figure 1 is an elevation of a spring shackle in section, showing the application thereto of a bearing embodying the features of this invention.

Figure 2 is a side elevation of Figure 1.

Figure 3 is a fragmentary cross section on the line III—III of Figure 2.

Figure 4 is a fragmentary longitudinal section of a modified form of bearing.

As shown on the drawings:

A spring shackle for vehicles has been chosen to illustrate the general type of oscillating bearing comprising the subject matter of this invention, a spring eye 10 formed in the end of a spring 11 being linked to a fixed bracket 12 by means of side shackles 13 linked together by a tie 14 in the form shown in Figures 1 to 3, the shackles having bearing housings 15 engaging the ends of stub shafts 16 passing through the spring eye 10 and the bracket 12, these stub shafts serving the purpose of the commonly used shackle bolts because the tie 14 eliminates the need of bolt heads and nuts to retain the shackles on the ends of the so-called shackle bolts. The housings 15 are bored out cylindrically to a diameter considerably larger than that of the shafts 16, as indicated at 17, the outer ends of the bores 17 being recessed to receive an end plug 18 which is inserted after the assembly of the shaft and bearings. A replaceable washer 19 is positioned between the spring eye and the housing 15 to take the wear therebetween.

Within the housing bores 17 and surrounding the ends of the shaft 16 are positioned two bearing members 20 comprising half-shells, the outer surfaces of which are cylindrically curved to fit the wall of the housing bore while the inner surfaces are curved to conform to the shaft 16, forming bearings therefor, the inner surfaces being eccentrically disposed with respect to the outer surfaces so that a cross section of the bearing members resembles a curved wedge. These members are preferably arranged in the housing bore with the thick ends of the wedge back to back in a plane at right angles to the line along which the major loads are imposed on the bearing and the two wedge like members 20 in each housing are urged apart by a curved spring 21 engaging each member so that each member tends to move in a direction towards the apex of the wedge thus taking up any slackness or wear in the bearing.

The modified form of Figure 4 is intended to eliminate the tie member 14 between the side shackles 13, the washer 19 being replaced by an intermediate flange 22 integral with the housing 15, the bore 17 thereof being otherwise unchanged as are the wedge like bearing members 20 and spring 21, the cover or end plug 18 being shown with a threaded opening 23 for lubricating purposes. In this modification the shaft 16 is turned down at 24 to receive the flange 22 and the bearing members 20, an outer flange 25 being secured on the end of the shaft after the assembly of the bearing, this flange serving to hold the shackle in place on the end of the shaft.

In assembling the first described form the shackles and the bracket or spring eye are aligned and the shaft 16 inserted from one end, the bearing members 20, spring 21 and cover 18 being inserted in each shackle housing 15. In the modified form of Figure 4 the shafts 16 are first inserted in the bracket and spring eye and the shackles applied from either side, the bearing members and spring being then inserted in the shackle housings and the outer flanges applied to the ends of the shafts.

It will thus be seen that I have produced an improved bearing for limited oscillatory movements that will be simple and easy to manufacture, service and lubricate and that will be automatically self adjusting in use to eliminate looseness and rattles.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In combination a spring shackle having cylindrically bored housings at its ends, bearing shells in said housing having outer walls conforming to the curvature of the housing bore and inner segmental cylindrical bearing surfaces eccentrically arranged with respect to the outer surfaces so as to be of general wedge shape in cross section, shackle pins seated in said bearing shells, said wedge like shells having their bases in opposed relationship and means for separating the bases of the bearing shells and forcing them in the direction of the apex of the wedge to take up wear in the bearing.

2. In a spring shackle having cylindrically bored housings and shackle pins therein, a pair of curved wedge-shaped seat members circumferentially disposed with their bases in spaced opposed relation between each housing and the pin and associated therewith and means constantly urging said members into wedging engagement with the respective surfaces of said housing and pin.

3. In a spring shackle having cylindrically bored housings and shackle pins therein, a pair of curved wedge-shaped seat members circumferentially disposed with their bases in spaced opposed relation between each housing and the pin and associated therewith and resilient means constantly urging said members into wedging engagement with the respective surfaces of said housing and pin.

4. In a spring shackle having cylindrically bored housings and shackle pins therein, a pair of curved wedge-shaped seat members circumferentially disposed with their bases in spaced opposed relation between a housing and pin and a curved spring secured at its ends to the bases of said seat members and constantly urging said members into wedging engagement with the respective surfaces of said housing and pin.

5. In a self adjusting bearing for an oscillating shaft including a cylindrical housing for said shaft, curved wedge-shaped seat members circumferentially disposed about said shaft with their corresponding ends in opposed spaced relation to form an eccentric bearing for said shaft, said members together being capable of assuming any position about said shaft, and means secured to said members and resiliently urging said members into wedging engagement with the respective surfaces of said housing and shaft.

6. In a self adjusting bearing for an oscillating shaft including a cylindrical housing for said shaft, curved wedge-shaped seat members circumferentially disposed about said shaft with their corresponding ends in opposed spaced relation to form a cylindrical bearing surface eccentric with respect to said housing for said shaft, said members together being capable of assuming any position about said shaft, and means resiliently urging said members into wedging engagement with the respective surfaces of said housing and shaft.

In testimony whereof I have hereunto subscribed my name at Detroit, Wayne County, Michigan.

GEORGE H. HUFFERD.